(12) United States Patent
Zheng et al.

(10) Patent No.: US 12,287,251 B1
(45) Date of Patent: Apr. 29, 2025

(54) METHOD AND DEVICE FOR TESTING STRESS OF HIGH-TEMPERATURE COMPONENT OF POWER PLANT BOILER

(71) Applicants: Yanshan University, Qinhuangdao (CN); CEIC Boiler & Pressure Vessel Inspection Co., Ltd., Beijing (CN); Jinxi (Qinhuangdao) Technology Co., Ltd., Qinhuangdao (CN)

(72) Inventors: Xiangfeng Zheng, Qinhuangdao (CN); Yue'e Chen, Qinhuangdao (CN); Shutao Wang, Qinhuangdao (CN); Jie Lu, Qinhuangdao (CN); Zhenghao Zhang, Qinhuangdao (CN); Changhua Li, Qinhuangdao (CN); Jiahui Huang, Qinhuangdao (CN)

(73) Assignees: Yanshan University, Qinhuangdao (CN); CEIC Boiler & Pressure Vessel Inspection Co., Ltd., Beijing (CN); Jinxi (Qinhuangdao) Technology Co., Ltd., Qinhuangdao (CN)

( * ) Notice: Subject to any disclaimer, the term of this patent is extended or adjusted under 35 U.S.C. 154(b) by 0 days.

(21) Appl. No.: 18/984,416

(22) Filed: Dec. 17, 2024

(30) Foreign Application Priority Data

May 10, 2024 (CN) .......................... 202410571148.4

(51) Int. Cl.
   *G01L 1/24* (2006.01)
   *F22B 37/38* (2006.01)
   (Continued)

(52) U.S. Cl.
   CPC .............. *G01L 1/242* (2013.01); *F22B 37/38* (2013.01); *G01N 3/16* (2013.01); *G01N 3/18* (2013.01)

(58) Field of Classification Search
   CPC . G01N 3/16; G01N 3/18; G01L 1/242; G01L 1/241; G01L 1/246; F22B 37/38
   See application file for complete search history.

(56) References Cited

U.S. PATENT DOCUMENTS

| 4,251,918 A * | 2/1981 | Duggan | G01B 7/18 33/790 |
| 4,884,456 A * | 12/1989 | Meline | G01B 5/30 33/787 |
| 2011/0005332 A1 * | 1/2011 | Wang | G01N 35/00 73/856 |

FOREIGN PATENT DOCUMENTS

| CN | 215572686 U | 1/2022 |
| CN | 115112685 A | 9/2022 |
| CN | 117288358 A | 12/2023 |

* cited by examiner

*Primary Examiner* — Herbert K Roberts
(74) *Attorney, Agent, or Firm* — Nitin Kaushik

(57) ABSTRACT

The present invention belongs to the technical field of stress detection and provides a method and device for testing stress of a high-temperature component of a power plant boiler. The adjusting assembly includes a plurality of bearing blocks, each bearing block is provided with an accommodating groove vertically, limiting blocks are disposed at two ends of the accommodating groove symmetrically, an elastic member, a first connecting rod, and a second connecting rod are disposed in the accommodating groove, and a limiting plate is fixedly connected to one end of each of the first connecting rod and the second connecting rod. According to the present invention, lengths of the first connecting rod and the second connecting rod extending out of the accommodating groove are adjusted, so that the device can be adjusted according to a caliber of a pipeline of the power plant boiler.

8 Claims, 10 Drawing Sheets

(51) Int. Cl.
*G01N 1/18* (2006.01)
*G01N 3/16* (2006.01)
*G01N 3/18* (2006.01)

METHOD AND DEVICE FOR TESTING STRESS OF HIGH-TEMPERATURE COMPONENT OF POWER PLANT BOILER

CROSS-REFERENCE TO RELATED APPLICATIONS

The application claims priority to Chinese patent application No. 202410571148.4, filed on May 10, 2024, the entire contents of which are incorporated herein by reference.

TECHNICAL FIELD

The present invention belongs to the technical field of stress detection, and specifically, to a device for testing stress without welding a detection member to a pipeline of a power plant boiler.

BACKGROUND

In the background of the construction of dual-carbon and novel power systems in China, a coal-fired power unit mostly adopts energy conservation and consumption reduction, wide-load rapid and flexible peak regulation, and other key technologies, and participation of a high-parameter and large-capacity coal-fired power unit in the deep peak regulation of a power grid gradually becomes normal. However, in a new power grid situation, when operated at an ultra-low load lower than the lowest design load, a boiler is very likely to induce a series of problems such as oxide scale peeling on a working medium side of a superheater (reheater), poor combustion stability of pulverized coal under a low load, hydrodynamic safety, creep fatigue damage of thick-walled components, and corrosion and leakage of low-temperature heated surfaces.

An operating condition is variable during frequent peak regulation of the unit, and a thick-walled pressure-bearing component of the boiler needs to withstand creep and fatigue loads caused by temperature and pressure fluctuations, which puts higher requirements on the reliability of the component. If a stress-strain distribution law of a high-temperature pipeline can be clearly known, and then a stress-strain monitoring device is mounted at a corresponding position, to monitor a surface strain state of the high-temperature pressure pipeline in real time and provide dynamic, real-time, and online invalidation monitoring data of the high-temperature pressure pipeline, thereby predicting a real-time life of the high-temperature pressure pipeline, the occurrence of accidents can be reduced. Therefore, the stress-strain monitoring of a pressure-bearing pipeline of a boiler of an ultra-supercritical unit has a wide range of practical needs and important application value.

There are many methods for monitoring stress and strain of a high-temperature pressure-bearing component, for example, a laser interferometric measurement method and a CCD camera imaging measurement method. According to the laser interferometric measurement method, apparatuses such as a hyperbolic interferometer or a laser interferometer are usually used to measure an optical path difference of each small region inside an object through the reflection and interference of light beams, thereby obtaining the stress distribution of the object. According to this method, the advantages are high precision, non-contact, and real-time performance, and the disadvantages are that a high degree of perpendicularity between a light source and a measured object is required and an anti-interference capability during monitoring is poor. According to the CCD camera imaging measurement method, strain change information can be obtained through light wave changes, and the disadvantages are that the price is expensive, pictures can be taken at only one point, and dynamic monitoring cannot be performed in real time.

According to an optical fiber grating measurement method used as a novel strain measurement method, light waves of the light source are used to sense a strain condition through an optical fiber grating sensor, and information is reflected in real time through a signal demodulation system. According to this method, the advantages are that costs are low, measurement errors are small, measurement precision is high, and anti-electromagnetic interference is good, and the disadvantage is that an optical fiber is generally welded to the surface of a pipeline of a power plant boiler through a patch of the same material as a to-be-detected pipeline as a substrate, to detect the pipeline, causing that it is difficult to remove the substrate from the surface of the pipeline of the power plant boiler after pipeline detection is completed, which does not facilitate secondary detection.

SUMMARY

To solve the above technical problems, the present invention provides a method and device for testing stress of a high-temperature component of a power plant boiler, to solve a problem that an optical fiber is generally welded to a surface of a pipeline of the power plant boiler through a patch of the same material as a to-be-detected pipeline as a substrate, to detect the pipeline.

A method and device for testing stress of a high-temperature component of a power plant boiler, including: an adjusting assembly and a test assembly, where the adjusting assembly includes a plurality of bearing blocks, each bearing block is provided with an accommodating groove vertically, limiting blocks are disposed at two ends of the accommodating groove symmetrically, an elastic member, a first connecting rod, and a second connecting rod are disposed in the accommodating groove, a limiting plate is fixedly connected to one end of each of the first connecting rod and the second connecting rod, each of the first connecting rod, the second connecting rod, and the limiting plate is provided with an arcuate hole, one end of the elastic member extends into the arcuate hole and is fixedly connected to the first connecting rod, the other end of the elastic member extends into the arcuate hole and is fixedly connected to the second connecting rod, a first limiting track is fixedly connected to each of the first connecting rod and the second connecting rod, a second limiting track is disposed on each side of the first limiting track, the second limiting track is fixedly connected to the bearing block, and each side of the bearing block is provided with a sliding groove vertically. The first connecting rod and the second connecting rod are pulled out, so that the first limiting track moves with the first connecting rod and the second connecting rod, thereby prolonging the second limiting track, to increase a detectable range of the test assembly and improve applicability of the device.

The test assembly includes double-headed motors disposed on a bottom portion of the bearing block symmetrically, a bearing plate is disposed on each side of each double-headed motor, a rotating shaft is fixedly connected to an output end on each side of the double-headed motor, the rotating shaft penetrates through the bearing plate horizontally and is connected to the bearing plate through a bearing, a first driven gear and a second driven gear are disposed on the rotating shaft, the first driven gear and the second driven gear are located on two sides of the bearing plate respectively, the second driven gear is engaged with the second limiting track, and the double-headed motor drives the rotating shaft to rotate, to drive the first driven gear and the second driven gear to rotate simultaneously, so that the test assembly moves along the first limiting track and the second limiting track, thereby detecting different points of the surface of the pipeline.

Preferably, a rack is fixedly connected to the first connecting rod, the second connecting rod is provided with an accommodating hole vertically, the second connecting rod is provided with a clamping groove vertically, and the accommodating hole vertically provided on the second connecting rod accommodates the rack, thereby facilitating connecting the first connecting rod and the second connecting rod.

Preferably, a first limiting shaft and a limiting gear are disposed in the accommodating hole, one end of the first limiting shaft extends into the clamping groove, the first limiting shaft is connected to the first connecting rod through a bearing, the first limiting shaft is fixedly connected to the limiting gear, and the limiting gear is engaged with the rack, thereby fixing the rack, to fixedly connect the first connecting rod and the second connecting rod and ensure that the device is not fractured during detection.

Preferably, a ratchet is fixedly connected to the first limiting shaft, a clamping block is disposed on one side of the ratchet, the clamping block is engaged with the ratchet, and the clamping block limits the ratchet, thereby facilitating fixing the rack in the accommodating hole through the limiting gear when the rack enters the accommodating hole to be engaged with the limiting gear, to ensure stable connection between the first connecting rod and the second connecting rod.

Preferably, a second limiting shaft is disposed on the clamping block vertically in a penetrating manner, the second limiting shaft is connected to the clamping block through a torsion spring, the second limiting shaft is fixedly connected to the first connecting rod, and the ratchet, the clamping block, and the second limiting shaft are located in the clamping groove.

Preferably, one end of the rotating shaft is hollow, a third connecting rod is disposed on one side of the rotating shaft, one end of the third connecting rod extends into the rotating shaft, the other end of the third connecting rod is connected to a rotating wheel through a bearing, the rotating wheel is located in the sliding groove, and the test assembly is limited through the third connecting rod and the rotating wheel, to ensure that the test assembly moves along the second limiting track.

Preferably, a pressing plate is fixedly connected to a bottom portion of the bearing plate, a plurality of electric telescopic rods are disposed on a bottom portion of the pressing plate, a substrate is disposed on bottom portions of the electric telescopic rods, a gasket is disposed on the substrate, a top portion of the substrate is provided with wiring grooves symmetrically and vertically, and the wiring grooves provided on the top portion vertically are located on two sides of the gasket.

Preferably, cover plates are disposed on one side of the substrate symmetrically, each cover plate is connected to the substrate through a hinge, an optical fiber is disposed in the wiring grooves, and two ends of the optical fiber both extend out of the wiring grooves.

A method for testing stress of a high-temperature component of a power plant boiler, including the following steps: S1: starting an electric telescopic rod, and driving, by the electric telescopic rod, a substrate to descend, to release attachment with a pressing plate; S2: placing an optical fiber in a wiring groove and above a gasket, and applying pulling force at two ends of the optical fiber, to enable the optical fiber to be kept in a taut state; S3: coating a high-temperature binder on the optical fiber in the groove uniformly, and turning over a cover plate, to enable the cover plate to cover the wiring groove; S4: starting the electric telescopic rod, and driving, by the electric telescopic rod, the substrate to rise, to enable the cover plate to be attached to the pressing plate; S5: squeezing the cover plate by the pressing plate, and waiting for the high-temperature binder to be solidified, to enable the optical fiber to be tightly combined with the substrate without sliding; S6: placing a plurality of bearing blocks around a to-be-detected pipeline, sequentially extending a rack on a first connecting rod into a clamping groove provided on a second connecting rod, and fixing the device on the to-be-detected pipeline; and S7: starting the electric telescopic rod again, and pushing, by the electric telescopic rod, the substrate to be attached to the to-be-detected pipeline.

Preferably, the gasket is made of a biaxially oriented polypropylene film, and the high-temperature binder is a high-temperature aluminum silicate heat preservation cotton binder.

Compared with the prior art, the present invention has the following beneficial effects:

1. According to the present invention, lengths of the first connecting rod and the second connecting rod extending out of the accommodating groove according to a caliber of the to-be-detected pipeline of the power plant boiler are adjusted, so that the device can be adjusted according to the caliber of the pipeline of the power plant boiler, thereby improving an application range of the device. The elastic member may apply pulling force to the first connecting rod and the second connecting rod according to the caliber of the pipeline of the power plant boiler, thereby ensuring that the substrate is attached to the surface of the pipeline of the power plant boiler, so that the device may detect the pipeline of the power plant boiler without welding the substrate to the surface of the pipeline of the power plant boiler.

2. According to the present invention, the high-temperature binder is uniformly coated on the optical fiber in the groove, the cover plate is turned over, to enable the cover plate to cover the wiring groove, the electric telescopic rod is started, the electric telescopic rod drives the substrate to rise, and the cover plate is attached to the pressing plate, to ensure that the optical fiber is tightly combined with the substrate without sliding.

3. According to the present invention, engagement between the clamping block and the ratchet is released, and the first connecting rod and the second connecting rod are retracted into the accommodating groove automatically under the action of the elastic member, to facilitate disassembly of the tester. During removal of the bearing block from the surface of the pipeline of the power plant boiler by the tester, the substrate is detached from the surface of the pipeline of the power plant boiler following the bearing block, to facilitate performing secondary detection on the pipeline of the power plant boiler.

4. According to the present invention, the distance between the adhesion points, the width of the gasket, and the quantity of the gaskets are adjusted, thereby implementing strain measurement at different temperatures.

Figure 1:
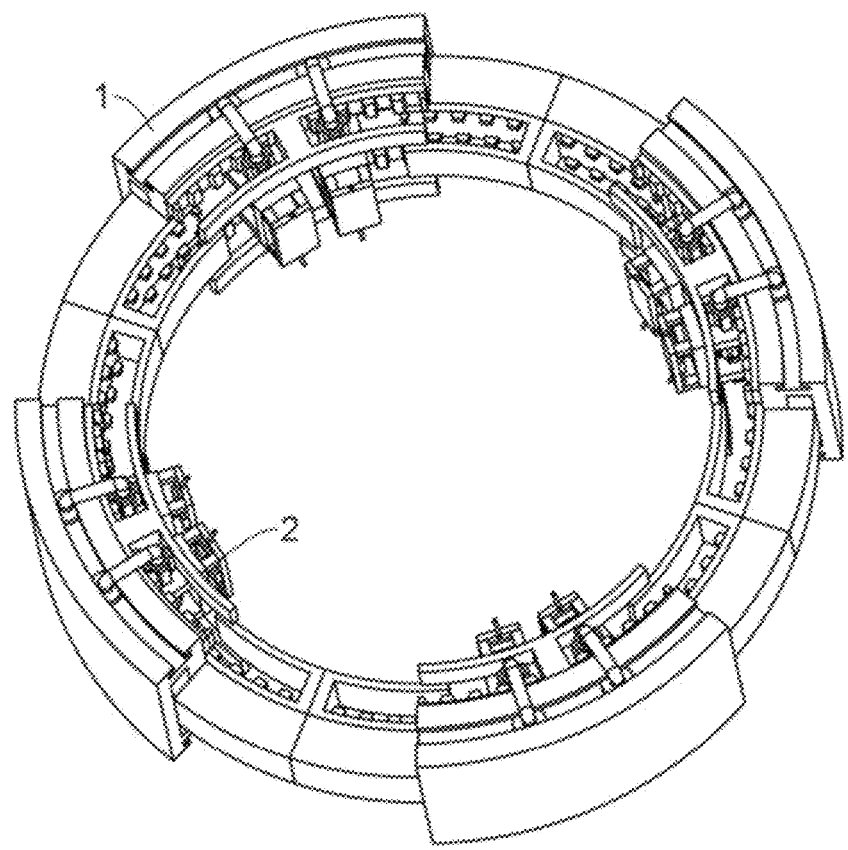
FIG. 1 is a schematic diagram of an overall structure according to the present invention.
Figure 2:
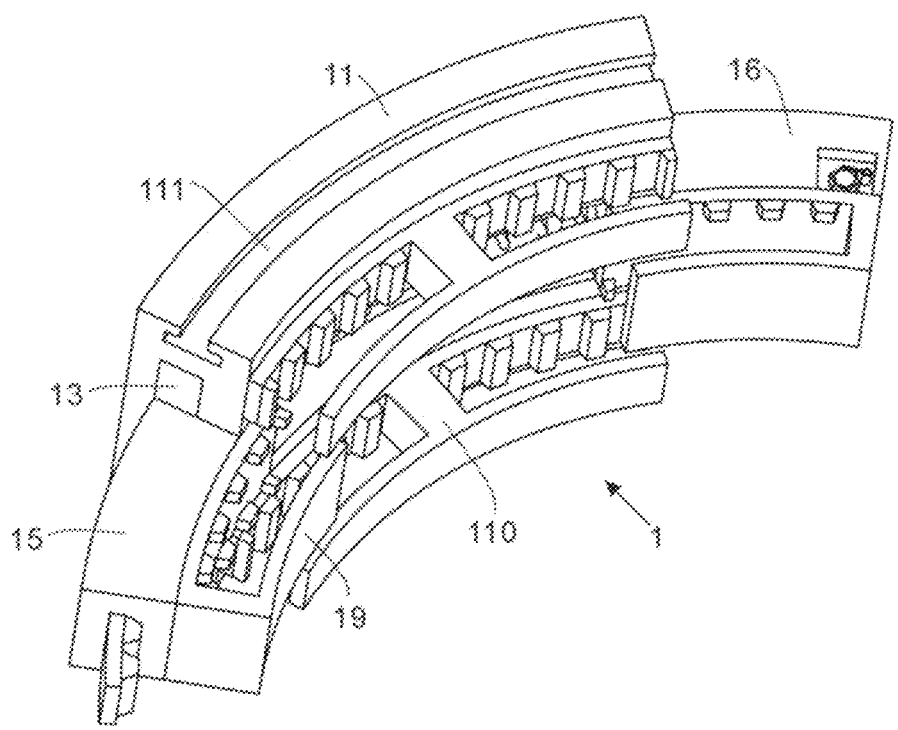
FIG. 2 is a schematic structural diagram of an adjusting assembly according to the present invention.
Figure 3:
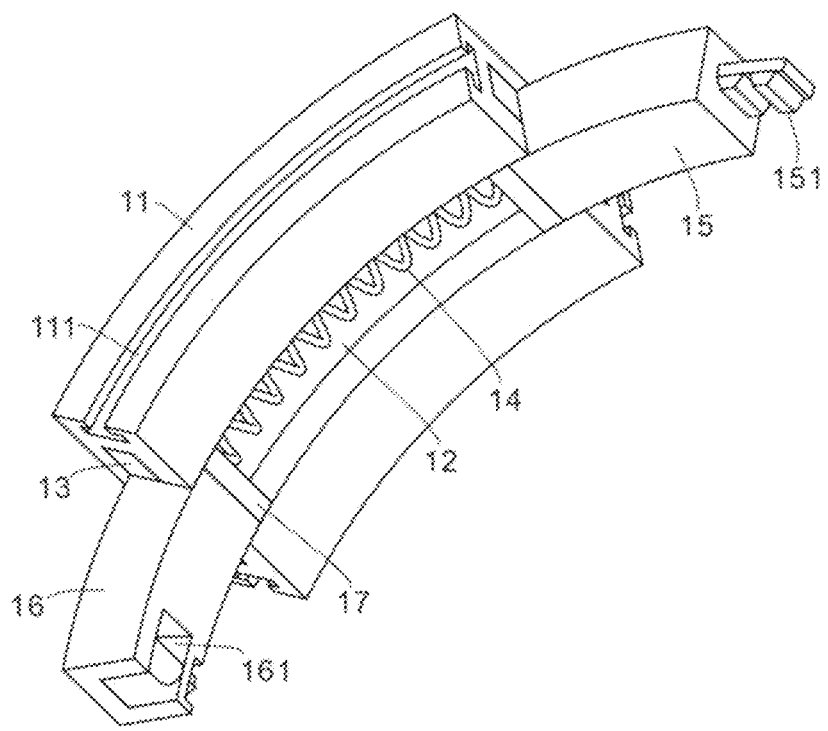
FIG. 3 is a schematic structural diagram of a bearing block, a first connecting rod, and a second connecting rod according to the present invention.
Figure 4:
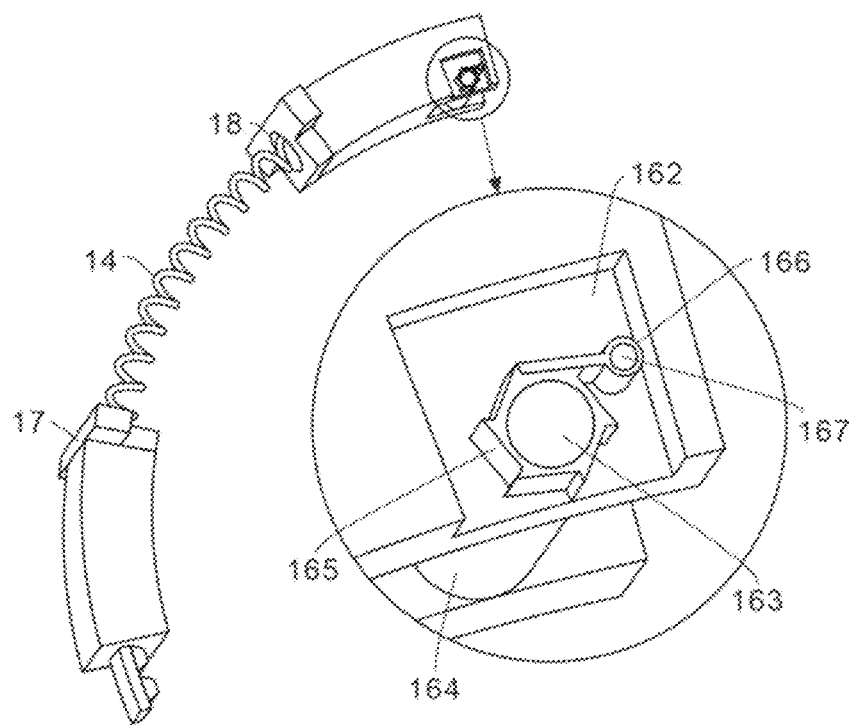
FIG. 4 is a schematic partial enlarged view of a structure of a second connecting rod according to the present invention.
Figure 5:
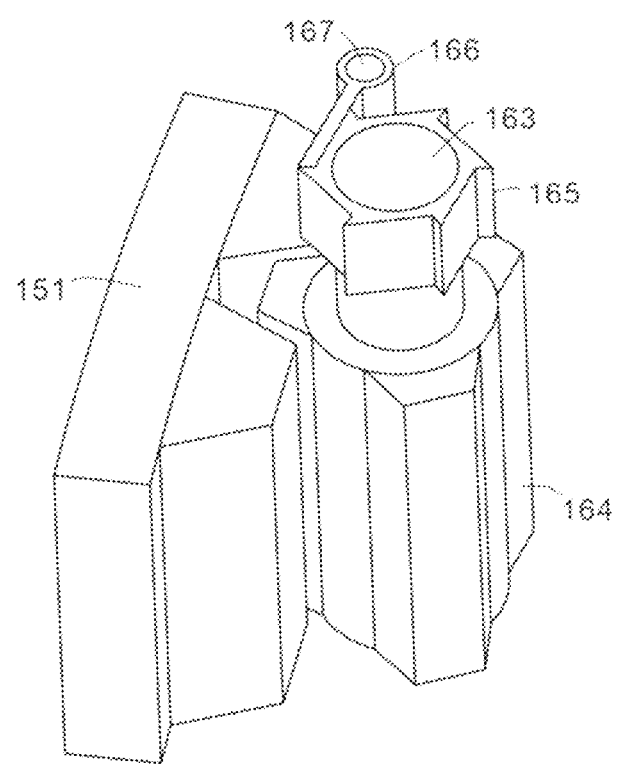
FIG. 5 is a schematic structural diagram of engagement of a rack and a limiting gear according to the present invention.
Figure 6:
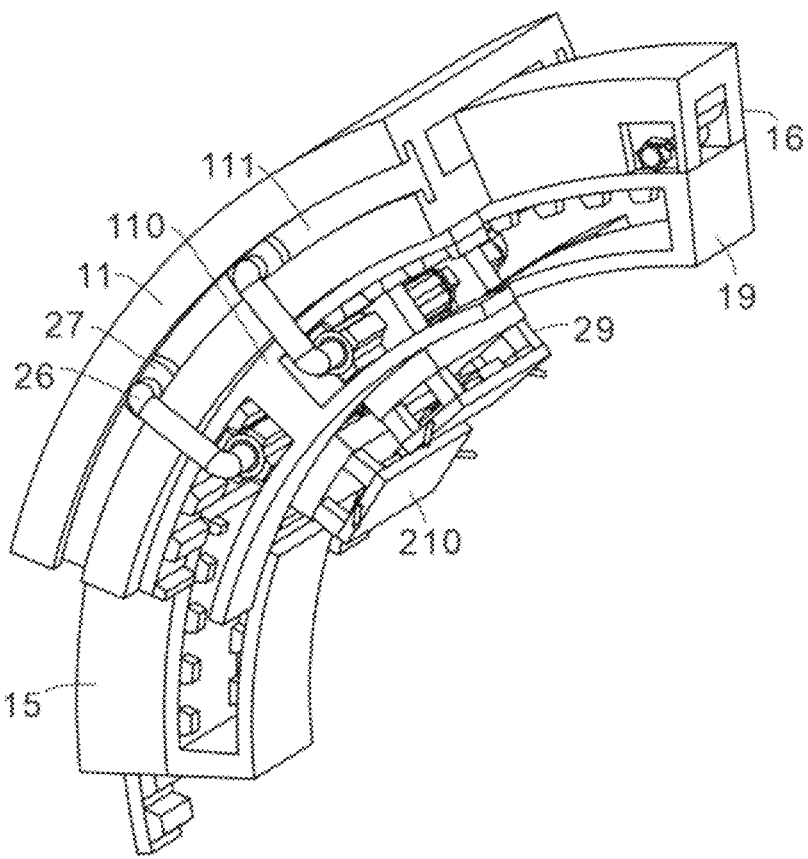
FIG. 6 is a schematic structural diagram of connection of an adjusting assembly and a test assembly according to the present invention.
Figure 7:
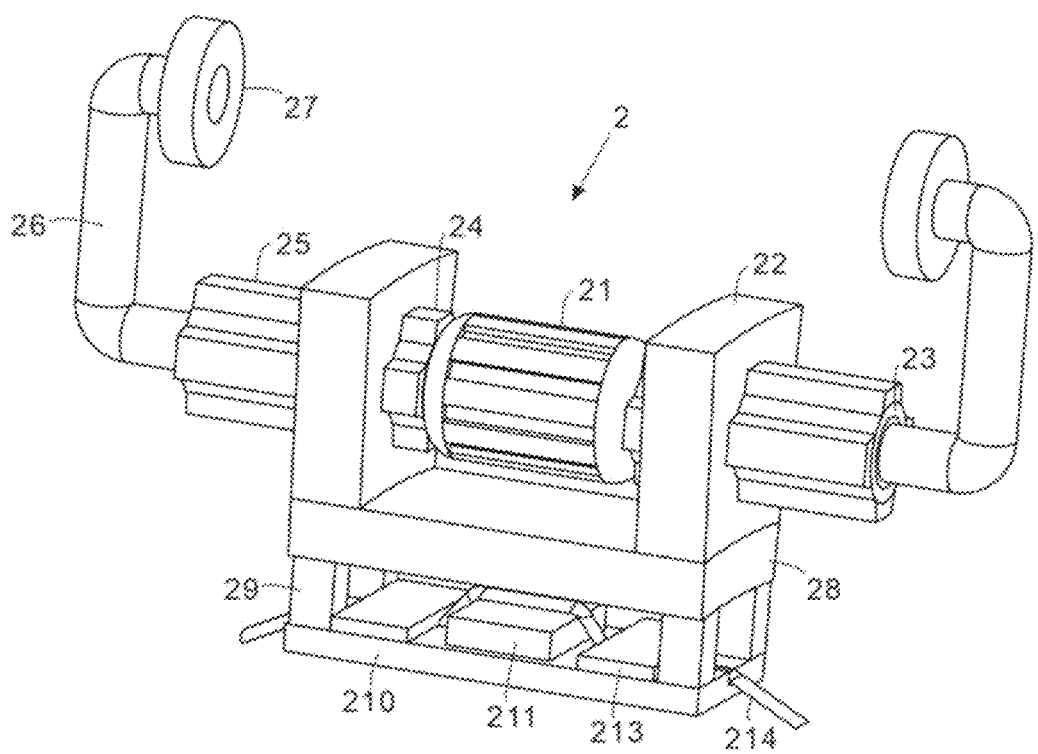
FIG. 7 is a schematic structural diagram of a test assembly according to the present invention.
Figure 8:
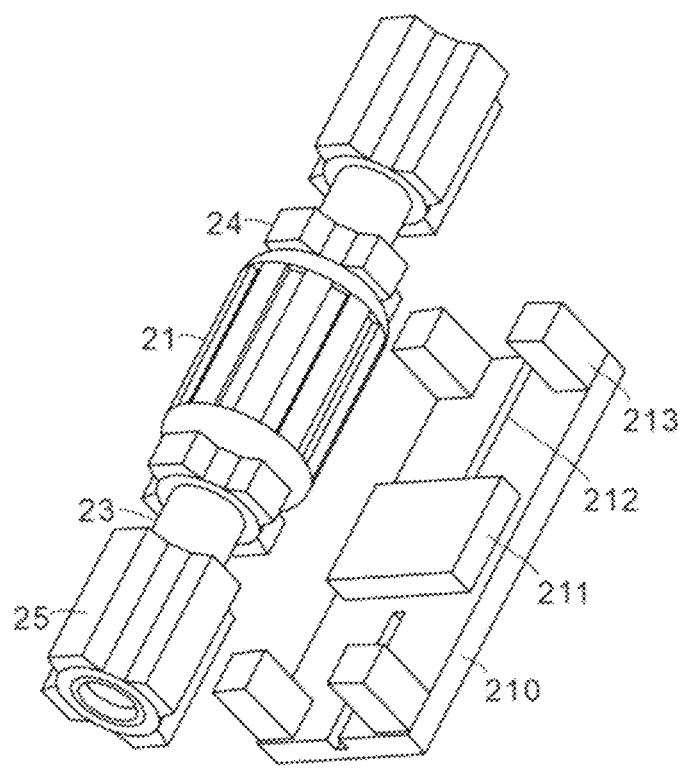
FIG. 8 is a schematic structural diagram of a rotating shaft and a substrate according to the present invention.

Reference numerals in the drawings: 1. adjusting assembly; 11. bearing block; 12. accommodating groove; 13. limiting block; 14. elastic member; 15. first connecting rod; 16. second connecting rod; 17. limiting plate; 18. arcuate hole; 19. first limiting track; 110. second limiting track; 111. sliding groove; 151. rack; 161. accommodating hole; 162. clamping groove; 163. first limiting shaft; 164. limiting gear; 165. ratchet; 166. clamping block; 167. second limiting shaft; 2. test assembly; 21. double-headed motor; 22. bearing plate; 23. rotating shaft; 24. first driven gear; 25. second driven gear; 26. third connecting rod; 27. rotating wheel; 28. pressing plate; 29. electric telescopic rod; 210. substrate; 211. gasket; 212. wiring groove; 213. cover plate; 214. optical fiber.

DETAILED DESCRIPTION OF THE EMBODIMENTS

The following describes implementations of the present invention in detail with reference to the accompanying drawings and embodiments. The following embodiments are only intended to illustrate the present invention rather than to limit the scope of the present invention.

The present invention provides a device for testing stress of a high-temperature component of a power plant boiler, including an adjusting assembly 1 that is on a surface of a pipeline of the power plant boiler and a test assembly 2 that performs a stress test on the pipeline of the power plant boiler. The adjusting assembly 1 includes a plurality of bearing blocks 11 bearing a first connecting rod 15 and a second connecting rod 16, and each bearing block 11 is vertically provided with an accommodating groove 12 accommodating an elastic member 14, the first connecting rod 15, and the second connecting rod 16. Limiting blocks 13 limiting a limiting plate 17 are disposed at two ends of the accommodating groove 12 symmetrically, and the first connecting rod 15 and the second connecting rod 16 that fix a first limiting track 19 and the elastic member 14 limiting the first connecting rod 15 and the second connecting rod 16 are disposed in the accommodating groove 12. The limiting plate 17 limiting the first connecting rod 15 and the second connecting rod 16 is fixedly connected to one end of each of the first connecting rod 15 and the second connecting rod 16, and each of the first connecting rod 15, the second connecting rod 16, and the limiting plate 17 is provided with an arcuate hole 18 accommodating the elastic member 14. One end of the elastic member 14 extends into the arcuate hole 18 and is fixedly connected to the first connecting rod 15, and the other end of the elastic member 14 extends into the arcuate hole 18 and is fixedly connected to the second connecting rod 16. The first limiting track 19 limiting the test assembly 2 is fixedly connected to each of the first connecting rod 15 and the second connecting rod 16, and a second limiting track 110 limiting the test assembly 2 is disposed on each side of the first limiting track 19. The second limiting track 110 is fixedly connected to the bearing block 11, and each side of the bearing block 11 is vertically provided with a sliding groove 111 limiting a rotating wheel 27.

It should be noted that two, three, four, or more bearing blocks 11 may be disposed, and four bearing blocks are only taken as an example in FIG. 1.

It should be noted that the elastic member 14 is a spring preferably.

The test assembly 2 includes double-headed motors 21 that are disposed on a bottom portion of the bearing block 11 symmetrically and that drive a rotating shaft 23 to rotate. A bearing plate 22 bearing a pressing plate 28 is disposed on each side of each double-headed motor 21, and the rotating shaft 23 driving a first driven gear 24 and a second driven gear 25 to rotate is fixedly connected to an output end on each side of the double-headed motor 21. The rotating shaft 23 penetrates through the bearing plate 22 horizontally and is connected to the bearing plate 22 through a bearing, and the first driven gear 24 driving the pressing plate 28 to move along the first limiting track 19 and the second driven gear 25 driving the pressing plate 28 to move along the second limiting track 110 are disposed on the rotating shaft 23. The first driven gear 24 and the second driven gear 25 are located on two sides of the bearing plate 22 respectively, and the second driven gear 25 is engaged with the second limiting track 110.

A rack 151 connecting the first connecting rod 15 and the second connecting rod 16 is fixedly connected to the first connecting rod 15, the second connecting rod 16 is vertically provided with an accommodating hole 161 accommodating the rack 151 and a limiting gear 164, and the second connecting rod 16 is vertically provided with a clamping groove 162 accommodating a ratchet 165, a clamping block 166, and a second limiting shaft 167. A first limiting shaft 163 limiting the limiting gear 164 and the limiting gear 164 limiting the rack 151 are disposed in the accommodating hole 161, one end of the first limiting shaft 163 extends into the clamping groove 162, the first limiting shaft 163 is connected to the first connecting rod 15 through a bearing, and the first limiting shaft 163 is fixedly connected to the limiting gear 164.

The ratchet 165 limiting the first limiting shaft 163 is fixedly connected to the first limiting shaft 163, the clamping block 166 limiting the ratchet 165 is disposed on one side of the ratchet 165, and the clamping block 166 is engaged with the ratchet 165. The second limiting shaft 167 limiting the clamping block 166 is disposed on the clamping block 166 vertically in a penetrating manner, the second limiting shaft 167 is connected to the clamping block 166 through a torsion spring, the second limiting shaft 167 is fixedly connected to the first connecting rod 15, and the ratchet 165, the clamping block 166, and the second limiting shaft 167 are located in the clamping groove 162.

One end of the rotating shaft 23 is hollow, a third connecting rod 26 connecting the rotating shaft 23 and the rotating wheel 27 is disposed on one side of the rotating shaft 23, one end of the third connecting rod 26 extends into the rotating shaft 23, the other end of the third connecting rod 26 is connected to the rotating wheel 27 limiting the bearing plate 22 through a bearing, and the rotating wheel 27 is located in the sliding groove 111. The pressing plate 28 pressing a cover plate 213 is fixedly connected to a bottom portion of the bearing plate 22, a plurality of electric telescopic rods 29 driving a substrate 210 to move are disposed on a bottom portion of the pressing plate 28, the substrate 210 bearing a gasket 211 is disposed on bottom portions of the electric telescopic rods 29, the gasket 211 bearing an optical fiber 214 is disposed on the substrate 210, a top portion of the substrate 210 is symmetrically and vertically provided with wiring grooves 212 accommodating the optical fiber 214, and the wiring grooves 212 provided on the top portion vertically are located on two sides of the gasket 211. Cover plates 213 pressing the optical fiber 214 is disposed on one side of the substrate 210 symmetrically, the cover plate 213 is connected to the substrate 210 through a hinge, the optical fiber 214 performing the stress test on the pipeline of the power plant boiler is disposed in the wiring grooves 212, and two ends of the optical fiber 214 both extend out of the wiring grooves 212.

Embodiment 1: As shown in FIG. 1 to FIG. 8, in the embodiment, when a stress test is performed on a pipeline of a power plant boiler, an electric telescopic rod 29 is first started, and the electric telescopic rod 29 drives a substrate 210 to descend, to release attachment with a pressing plate 28. An optical fiber 214 is placed in a wiring groove 212 and above a gasket 211, and pulling force is applied at two ends of the optical fiber 214, to enable the optical fiber 214 to be kept in a taut state. A high-temperature binder is coated on the optical fiber 214 in the groove, and a cover plate 213 is turned over, to enable the cover plate 213 to cover the wiring groove 212. The electric telescopic rod 29 is started, and the electric telescopic rod 29 drives the substrate 210 to rise, to enable the cover plate 213 to be attached to the pressing plate 28, to ensure that the optical fiber 214 to be tightly combined with the substrate 210 without sliding.

A bearing block 11 is placed on a to-be-detected pipeline of the power plant boiler, and a first connecting rod 15 is pulled out, to enable a rack 151 on the first connecting rod 15 to extend into an accommodating hole 161 vertically provided on a second connecting rod 16 disposed on an adjacent bearing block 11. During extension of the rack 151 into the accommodating hole 161, a tooth block on the rack 151 first drives a limiting gear 164 to rotate anticlockwise, so that the rack 151 is engaged with the limiting gear 164, and a clamping block 166 abuts against a ratchet 165, so that a first limiting shaft 163 cannot drive the limiting gear 164 to rotate clockwise, thereby fixing the rack 151 in the accommodating hole 161, to ensure that the first connecting rod 15 is stably connected to the second connecting rod 16.

During connection between the first connecting rod 15 and the second connecting rod 16, a tester may adjust lengths of the first connecting rod 15 and the second connecting rod 16 extending out of an accommodating groove 12 according to a caliber of the to-be-detected pipeline of the power plant boiler, so that a device can be adjusted according to the caliber of the pipeline of the power plant boiler, thereby improving an application range of the device. An elastic member 14 may apply pulling force to the first connecting rod 15 and the second connecting rod 16 according to the caliber of the pipeline of the power plant boiler, thereby ensuring that the substrate 210 is attached to a surface of the pipeline of the power plant boiler, so that the device may detect the pipeline of the power plant boiler without welding the substrate 210 to the surface of the pipeline of the power plant boiler.

It should be noted that if the surface of the pipeline of the power plant boiler is uneven, causing that the substrate 210 is not completely attached to the surface of the pipeline of the power plant boiler, the electric telescopic rod 29 may be started, and the electric telescopic rod 29 pushes the substrate 210 to further be attached to the surface of the pipeline of the power plant boiler, to ensure that the substrate 210 is completely attached to the surface of the pipeline of the power plant boiler, thereby ensuring accurate test data.

After connection of the bearing block 11 is completed, a double-headed motor 21 is started, and the double-headed motor 21 drives a rotating shaft 23 to rotate, thereby driving a first driven gear 24 and a second driven gear 25. When a bearing plate 22 is located on a second limiting track 110, the second driven gear 25 drives the bearing plate 22 to move along the second limiting track 110. At this time, a third connecting rod 26 and a rotating wheel 27 limit the bearing plate 22, to ensure that the bearing plate 22 moves along the second limiting track 110. When the first driven gear 24 is engaged with a first limiting track 19, the double-headed motor 21 and the pressing plate 28 are located on an inner side and an outer side of the first limiting track 19 respectively, thereby limiting the bearing plate 22, to ensure that the bearing plate 22 to move along the first limiting track 19, so that the device can detect any point of the surface of the pipeline of the power plant boiler, improving the application range of the device.

When detection is completed, engagement between the clamping block 166 and the ratchet 165 is released, and the first connecting rod 15 and the second connecting rod 16 are retracted into the accommodating groove 12 automatically under the action of the elastic member 14, to facilitate disassembly of the tester. During removal of the bearing block 11 from the surface of the pipeline of the power plant boiler by the tester, the substrate 210 is detached from the surface of the pipeline of the power plant boiler following the bearing block 11, to facilitate performing secondary detection on the pipeline of the power plant boiler.

Figure 9:
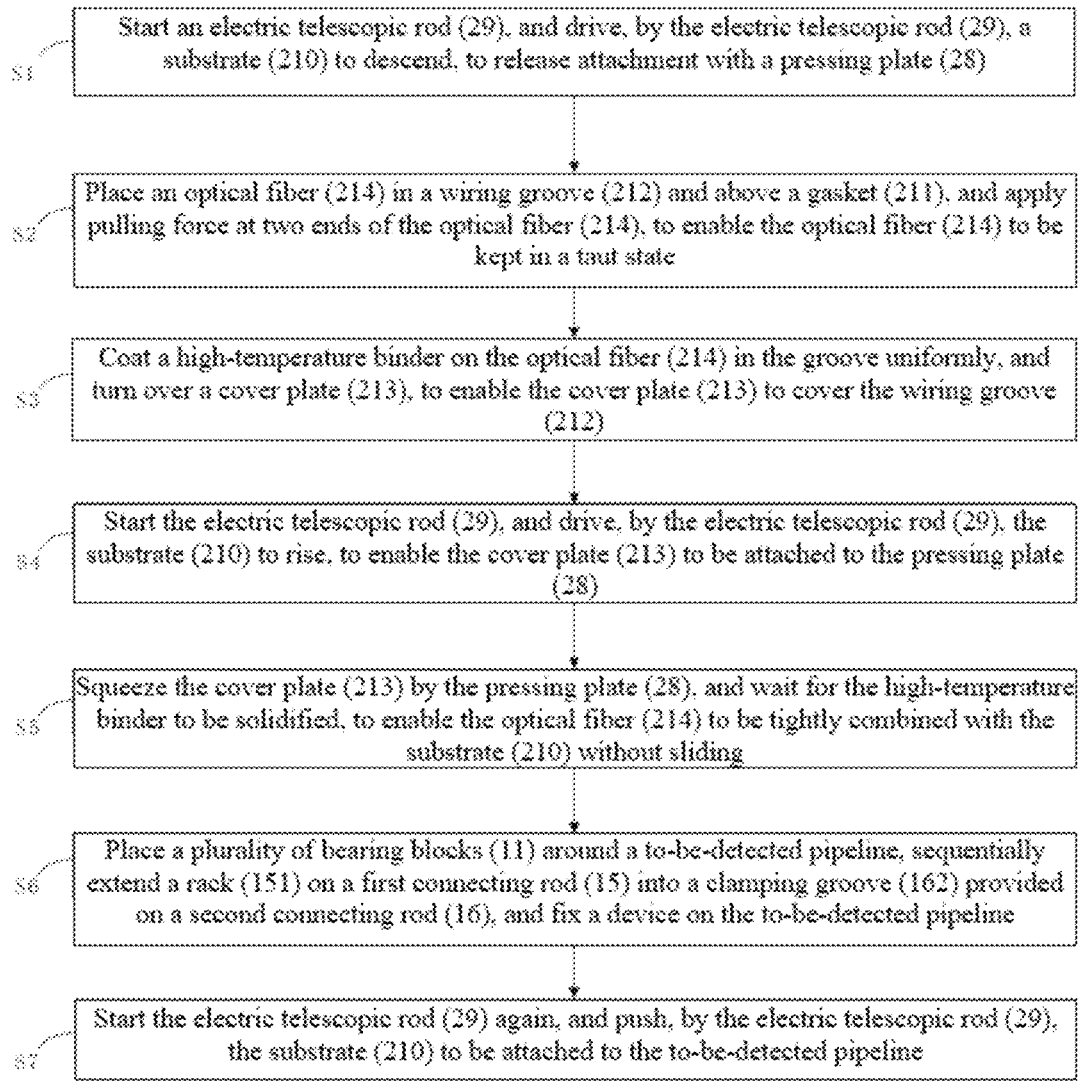
FIG. 9 is a flowchart of a stress test according to the present invention.
Figure 10:
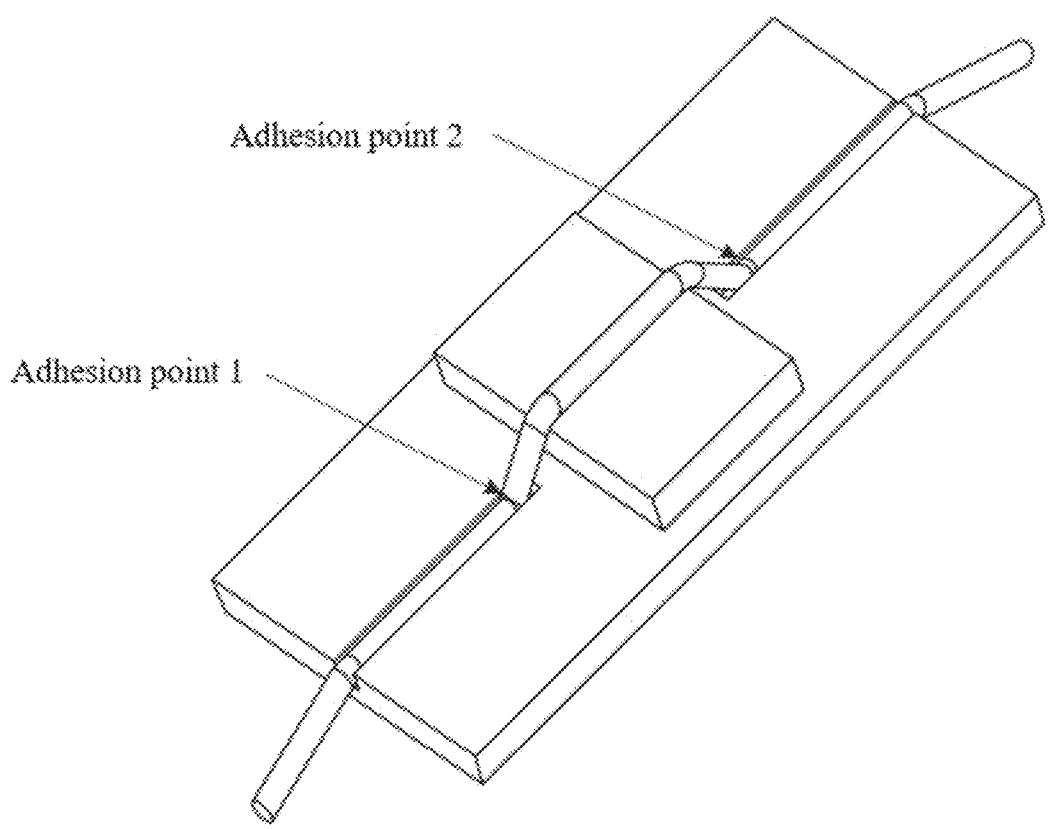
FIG. 10 is a schematic diagram of an adhesion point of an optical fiber in a wiring groove according to the present invention.

Embodiment 2: As shown in FIG. 9 and FIG. 10, in the embodiment, a method for testing stress of a high-temperature component of a power plant boiler, including the following steps:

S1: starting an electric telescopic rod 29, and driving, by the electric telescopic rod 29, a substrate 210 to descend, to release attachment with a pressing plate 28;
it should be noted that the substrate 210 is made of a thin steel plate of the same material as a pipeline;

S2: placing an optical fiber 214 in a wiring groove 212 and above a gasket 211, and applying pulling force at two ends of the optical fiber 214, to enable the optical fiber 214 to be kept in a taut state;

S3: coating a high-temperature binder on the optical fiber 214 in the groove uniformly, and turning over a cover plate 213, to enable the cover plate 213 to cover the wiring groove 212;

S4: starting the electric telescopic rod 29, and driving, by the electric telescopic rod 29, the substrate 210 to rise, to enable the cover plate 213 to be attached to the pressing plate 28;

S5: squeezing the cover plate 213 by the pressing plate 28, and waiting for the high-temperature binder to be solidified, to enable the optical fiber 214 to be tightly combined with the substrate 210 without sliding;

S6: placing a plurality of bearing blocks 11 around a to-be-detected pipeline, sequentially extending a rack 151 on a first connecting rod 15 into a clamping groove 162 provided on a second connecting rod 16, and fixing a device on the to-be-detected pipeline; and S7: starting the electric telescopic rod 29 again, and pushing, by the electric telescopic rod 29, the substrate 210 to be attached to the to-be-detected pipeline.

The gasket 211 is made of a biaxially oriented polypropylene film, and the high-temperature binder is a high-temperature aluminum silicate heat preservation cotton binder.

As shown in FIG. 10, the gasket 211 is pre-disposed to provide the optical fiber 214 that is quantitative and redundant. When a specific temperature is reached, redundancy of the optical fiber 214 compensates for thermal expansion of a to-be-detected object, and a working temperature zone of an optical fiber 214 gating sensor may be accurately regulated by using the method. During rising of the temperature, the thermal expansion of the to-be-detected object gradually counteracts the redundancy of the optical fiber 214.

A length $L_2$ of the optical fiber 214 between adhesion points is:

$$L_2 = 2\sqrt{(nh)^2 + \left(\frac{L_1 - K}{2}\right)^2} + K;$$

During rising of an optical fiber grating from a room temperature $T_r$ to a temperature $T_s$, expansion $\Delta L$ of the optical fiber 214 between two adhesion points is:

$$\Delta L = \alpha_1 L_2 T_s - T_r; \text{and}$$

axial expansion $\Delta d$ of a metal substrate between the two adhesion points is:

$$\Delta d = \alpha_2 L_1 (T_s - T_r).$$

In the formulas, $L_1$ is a distance between the two adhesion points of the optical fiber grating, K is the width of the gasket 211, h is the thickness of the gasket 211, n is a quantity of the gaskets 211, $\alpha_1$ is a thermal expansion coefficient of the optical fiber 214, and $\alpha_2$ is a thermal expansion coefficient of the to-be-detected object.

If $L_2 + \Delta L = L_1 + \Delta d$, it indicates that at the temperature $T_s$, thermal expansion of the to-be-detected object counteracts the redundancy of the optical fiber 214, and the optical fiber grating starts to measure strain generated by the to-be-detected object.

It can be known from the above formulas, the redundancy of the optical fiber grating may be adjusted through the distance between the adhesion points, the width K of the gasket 211, and the quantity n of the gaskets, thereby implementing strain measurement at different temperatures.

The remaining structures are the same as those in Embodiment 1.

The embodiments of the present invention are given for purposes of illustration and description. Although the embodiments of the present invention are shown and described above, it can be understood that the above embodiments are examples and shall not be construed as a limitation to the present invention. Those of ordinary skill in the art may make changes, modifications, substitutions, and variants based on the above embodiments within the scope of the present invention.

What is claimed is:

1. A device for testing stress of a high-temperature component of a power plant boiler, comprising: an adjusting assembly (1) and a test assembly (2), wherein the adjusting assembly (1) comprises a plurality of bearing blocks (11), each bearing block (11) is provided with an accommodating groove (12) vertically, limiting blocks (13) are disposed at two ends of the accommodating groove (12) symmetrically, an elastic member (14), a first connecting rod (15), and a second connecting rod (16) are disposed in the accommodating groove (12), a limiting plate (17) is fixedly connected to one end of each of the first connecting rod (15) and the second connecting rod (16), each of the first connecting rod (15), the second connecting rod (16), and the limiting plate (17) is provided with an arcuate hole (18), one end of the elastic member (14) extends into the arcuate hole (18) and is fixedly connected to the first connecting rod (15), the other end of the elastic member (14) extends into the arcuate hole (18) and is fixedly connected to the second connecting rod (16), a first limiting track (19) is fixedly connected to each of the first connecting rod (15) and the second connecting rod (16), a second limiting track (110) is disposed on each side of the first limiting track (19), the second limiting track (110) is fixedly connected to the bearing block (11), and each side of the bearing block (11) is provided with a sliding groove (111) vertically;

the test assembly (2) comprises double-headed motors (21) disposed on a bottom portion of the bearing block (11) symmetrically, a bearing plate (22) is disposed on each side of each double-headed motor (21), a rotating shaft (23) is fixedly connected to an output end on each side of the double-headed motor (21), the rotating shaft (23) penetrates through the bearing plate (22) horizontally and is connected to the bearing plate (22) through a bearing, a first driven gear (24) and a second driven gear (25) are disposed on the rotating shaft (23), the first driven gear (24) and the second driven gear (25) are located on two sides of the bearing plate (22) respectively, and the second driven gear (25) is engaged with the second limiting track (110);

a pressing plate (28) is fixedly connected to a bottom portion of the bearing plate (22), a plurality of electric telescopic rods (29) are disposed on a bottom portion of the pressing plate (28), a substrate (210) is disposed on bottom portions of the electric telescopic rods (29), a gasket (211) is disposed on the substrate (210), a top portion of the substrate (210) is provided with wiring grooves (212) symmetrically and vertically, and the wiring grooves (212) provided on the top portion vertically are located on two sides of the gasket (211); and cover plates (213) are disposed on one side of the substrate (210) symmetrically, each cover plate (213) is connected to the substrate (210) through a hinge, an optical fiber (214) is disposed in the wiring grooves (212), and two ends of the optical fiber (214) both extend out of the wiring grooves (212).

2. The device for testing stress of a high-temperature component of a power plant boiler according to claim 1, wherein a rack (151) is fixedly connected to the first connecting rod (15), the second connecting rod (16) is provided with an accommodating hole (161) vertically, and the second connecting rod (16) is provided with a clamping groove (162) vertically.

3. The device for testing stress of a high-temperature component of a power plant boiler according to claim 2, wherein a first limiting shaft (163) and a limiting gear (164) are disposed in the accommodating hole (161), one end of the first limiting shaft (163) extends into the clamping groove (162), the first limiting shaft (163) is connected to the first connecting rod (15) through a bearing, and the first limiting shaft (163) is fixedly connected to the limiting gear (164).

4. The device for testing stress of a high-temperature component of a power plant boiler according to claim 3, wherein a ratchet (165) is fixedly connected to the first limiting shaft (163), a clamping block (166) is disposed on one side of the ratchet (165), and the clamping block (166) is engaged with the ratchet (165).

5. The device for testing stress of a high-temperature component of a power plant boiler according to claim 4, wherein a second limiting shaft (167) is disposed on the clamping block (166) vertically in a penetrating manner, the second limiting shaft (167) is connected to the clamping block (166) through a torsion spring, the second limiting shaft (167) is fixedly connected to the first connecting rod (15), and the ratchet (165), the clamping block (166), and the second limiting shaft (167) are located in the clamping groove (162).

6. The device for testing stress of a high-temperature component of a power plant boiler according to claim 5, wherein one end of the rotating shaft (23) is hollow, a third connecting rod (26) is disposed on one side of the rotating shaft (23), one end of the third connecting rod (26) extends into the rotating shaft (23), the other end of the third connecting rod (26) is connected to a rotating wheel (27) through a bearing, and the rotating wheel (27) is located in the sliding groove (111).

7. A method for testing stress of a high-temperature component of a power plant boiler, adopting a device for testing stress of a high-temperature component of a power plant boiler according to claim 6, comprising the following steps:
- S1: starting an electric telescopic rod (29), and driving, by the electric telescopic rod (29), a substrate (210) to descend, to release attachment with a pressing plate (28);
- S2: placing an optical fiber (214) in a wiring groove (212) and above a gasket (211), and applying pulling force at two ends of the optical fiber (214), to enable the optical fiber (214) to be kept in a taut state;
- S3: coating a high-temperature binder on the optical fiber (214) in the groove uniformly, and turning over a cover plate (213), to enable the cover plate (213) to cover the wiring groove (212);
- S4: starting the electric telescopic rod (29), and driving, by the electric telescopic rod (29), the substrate (210) to rise, to enable the cover plate (213) to be attached to the pressing plate (28);
- S5: squeezing the cover plate (213) by the pressing plate (28), and waiting for the high-temperature binder to be solidified, to enable the optical fiber (214) to be tightly combined with the substrate (210) without sliding;
- S6: placing a plurality of bearing blocks (11) around a to-be-detected pipeline, sequentially extending a rack (151) on a first connecting rod (15) into a clamping groove (162) provided on a second connecting rod (16), and fixing the device on the to-be-detected pipeline; and
- S7: starting the electric telescopic rod (29) again, and pushing, by the electric telescopic rod (29), the substrate (210) to be attached to the to-be-detected pipeline.

8. The method for testing stress of a high-temperature component of a power plant boiler according to claim 7, wherein the gasket (211) is made of a biaxially oriented polypropylene film, and the high-temperature binder is a high-temperature aluminum silicate heat preservation cotton binder.

\* \* \* \* \*